United States Patent
Kim et al.

(10) Patent No.: US 8,526,818 B2
(45) Date of Patent: Sep. 3, 2013

(54) OPTICAL NETWORK TERMINAL OF THE GIGABIT PASSIVE OPTICAL NETWORK AND FRAME TREATMENT METHOD OF THE ONT

(75) Inventors: Kwang-ok Kim, Jeollabuk-do (KR); Yong-tae Kim, Daejeon-si (KP); Dong-soo Lee, Gwangju-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 457 days.

(21) Appl. No.: 12/747,330

(22) PCT Filed: Apr. 28, 2009

(86) PCT No.: PCT/KR2009/002227
§ 371 (c)(1),
(2), (4) Date: Jun. 10, 2010

(87) PCT Pub. No.: WO2010/038933
PCT Pub. Date: Apr. 8, 2010

(65) Prior Publication Data
US 2010/0260498 A1    Oct. 14, 2010

(30) Foreign Application Priority Data
Oct. 2, 2008 (KR) .................. 10-2008-0096977

(51) Int. Cl.
*H04B 14/00* (2006.01)
(52) U.S. Cl.
USPC .......................................................... 398/67
(58) Field of Classification Search
USPC .......................................... 398/67, 154, 155
See application file for complete search history.

(56) References Cited

U.S. PATENT DOCUMENTS

| | | | |
|---|---|---|---|
| 7,860,398 B2 * | 12/2010 | Tatum et al. | 398/141 |
| 7,983,308 B1 * | 7/2011 | Johnston et al. | 370/514 |
| 2004/0008703 A1 | 1/2004 | Kim et al. | |
| 2007/0116465 A1 * | 5/2007 | Bieker | 398/70 |

(Continued)

FOREIGN PATENT DOCUMENTS

| | | |
|---|---|---|
| JP | 2007-281979 A | 10/2007 |
| JP | 2008-160658 A | 7/2008 |

(Continued)

OTHER PUBLICATIONS

ITU-T G.984.3, Gigabit-capable Passive Optical Networks (G-PON): Transmission convergence layer specification, 2004, pp. 29-30.*

*Primary Examiner* — Shi K Li
(74) *Attorney, Agent, or Firm* — Rabin & Berdo, P.C.

(57) ABSTRACT

A gigabit passive optical network (GPON) system for fiber to the home (FTTH) service must provide a down-stream data rate of an optical band to provide IPTV service with hundreds of channels to subscribers, and must be able to provide an upstream data rate of an optical band using a currently available BM-IC chip. A currently available BM-IC chip for a GPON has 1.244 Gbps and 2.488 Gbps modes. Accordingly, an optical network terminal (ONT) for a GPON that is capable of providing a downstream transmission band of 10-Gbps and an upstream transmission band of 1.244 Gbps or 2.488 Gbps, and a method for processing an upstream frame in the terminal, are provided. The GPON ONT can provide 20 Mbps, high-definition IPTV service with 500 channels and can provide both upstream data rates of 1.244 Gbps and 2.488 Gbps according to a user's selection without using an additional device.

11 Claims, 5 Drawing Sheets

(56) References Cited

U.S. PATENT DOCUMENTS

| | | |
|---|---|---|
| 2008/0037535 A1 | 2/2008 | Yoon et al. |
| 2008/0170586 A1* | 7/2008 | Huff et al. ............... 370/463 |
| 2008/0260385 A1 | 10/2008 | Eguchi |
| 2009/0208207 A1* | 8/2009 | Suvakovic ............... 398/45 |
| 2009/0304385 A1* | 12/2009 | Khermosh ............... 398/58 |
| 2011/0194854 A1* | 8/2011 | Freire et al. ............... 398/58 |
| 2012/0033973 A1* | 2/2012 | Trojer et al. ............... 398/72 |

FOREIGN PATENT DOCUMENTS

| | | |
|---|---|---|
| JP | 2008-160659 A | 7/2008 |
| KR | 2004-0006635 A | 1/2004 |
| KR | 2008-0050196 A | 6/2008 |

\* cited by examiner

OPTICAL NETWORK TERMINAL OF THE GIGABIT PASSIVE OPTICAL NETWORK AND FRAME TREATMENT METHOD OF THE ONT

TECHNICAL FIELD

The present invention relates to an optical network, and more particularly, to an optical network terminal (ONT) in a gigabit passive optical network (GPON) and a method for processing an upstream frame in the terminal.

BACKGROUND ART

In general, Gigabit Passive Optical Network (GPON) technology standardized by the ITU-T G.984 group is one type of Fiber to the Home (FTTH) technology for efficiently providing transmission bands to subscribers and servicing a variety of protocols. In the GPON technology, one optical line terminal (OLT) is connected to a plurality of optical network terminals (ONTs) in a point-to-multipoint structure, as in Ethernet-PON (EPON) technology. Current GPON technology has a symmetrical or asymmetrical structure capable of providing a downstream transmission band of 2.488 Gbps and an upstream transmission band of 1.244 Gbps, unlike the EPON technology capable of providing only upstream/downstream transmission bands of 1 Gbps.

FIG. 1 illustrates a structure of a GPON ONT according to a standard of the ITU-T G.984 group. In the GPON ONT according to the G.984 GPON standard, a GPON protocol layer is present under a data link layer and converts a variety of services (e.g., ATM, Ethernet, and TDM) of the link layer into a GPON frame and transmits the GPON frame. In the GPON ONT, a GPON protocol consists of a physical layer B100 and a transmission convergence (TC) layer B101. The physical layer B100 performs photoelectric conversion, burst transmission, clock extraction, and the like. A current G.984 standard allows for downstream data rates of 1.244 Gbps and 2.488 Gbps and upstream data rates of 155.52 Mbps, 622.08 Mbps, 1.244 Gbps and 2.488 Gbps. However, low-rate transmission bands of 155.52 Mbps and 622.08 Mbps are not actually used. The TC layer B101 includes a GTC framing sub-layer 100 and a GPON encapsulation method (GEM) TC adaptation sub-layer 101.

The GTC framing sub-layer 100 performs multiplexing or demultiplexing into a GPON transmission convergence (GPON TC, GTC) frame using frames and physical layer operation administration maintenance (PLOAM) message information 104 received from a GEM client 106, DBA information 102, and synchronization information. The TC adaptation sub-layer 101 performs connection or disconnection to or from an upper service using a GEM Port-ID identifier with respect to GEM service. The GEM client connects to services such as Ethernet and TDM. An upstream bandwidth control (UBC) transmission layer 102 extracts a transmission band time assigned by the GPON OLT to control an upstream transmission time for ONUs. The physical layer OAM (PLOAM) 104 delivers information for management of the GPON physical layer and the framing sub-layer. The ONT management control interface (OMCI) 103 manages statistical information and state for the GPON ONTs.

The GPON ONT defined in the G.984 standard cannot efficiently provide high-definition IPTV service with hundreds of channels to subscribers due to its limited transmission band. Accordingly, there is a need for a scheme for providing high-definition IPTV service with hundreds of channels to subscribers.

DISCLOSURE OF INVENTION

Technical Problem

The present invention is directed to an optical network terminal in a gigabit passive optical network (GPON) that is capable of efficiently providing high-definition IPTV service with hundreds of channels.

Also, the present invention is directed to an optical network terminal in a GPON that is capable of providing 20 Mbps, high-definition IPTV service with a maximum of 500 channels to subscribers and providing an upstream transmission band of 2.488 Gbps.

Also, the present invention is directed to an optical network terminal in a GPON and a method for processing an upstream frame in the terminal that are capable of providing 20 Mbps, high-definition IPTV service with a maximum of 500 channels to subscribers and selectively providing upstream transmission bands of 1.244 Gbps and 2.488 Gbps.

Also, the present invention is directed to an apparatus and method capable of selectively supporting any one of a plurality of data rates by a user simply manipulating one GPON ONT without using an additional device in upstream transmission.

Technical Solution

The present invention provides an optical network terminal (ONT) in a gigabit passive optical network (GPON), the ONT comprising: a demultiplexer (DEMUX) for extracting a clock from a downstream electrical signal output from a photoelectric converter and converting the electrical signal into a parallel signal; a multiplexer (MUX) for converting an upstream parallel electrical signal into a serial electrical signal using the clock extracted by the DEMUX; a medium access control (MAC) block having a protocol processing function of the GPON, wherein the MAC block services any one of at least two data rates for the upstream signal according to a user's selection; a physical (PHY) layer for transmitting a subscriber Ethernet frame extracted by the MAC block to a subscriber port; and an optical module for converting the downstream electrical signal output from the PHY layer into an optical signal and outputting the optical signal, or converting an input optical signal into an electrical signal and outputting the electrical signal to the PHY layer.

The MAC block may service an upstream data rate of 2.488 Gbps or 1.244 Gbps and a downstream data rate of 10 Gbps according to a user's selection.

The MAC block may differently set a preamble length of a GPON transmission convergence (GTC) frame depending on a set upstream data rate. The MAC block may repeatedly transmit the GTC frame at the upstream data rate of 1.244 Gbps.

The present invention also provides a method for processing an upstream frame in a GPON optical network terminal capable of providing service for a plurality of transmission bands for an upstream signal, the method comprising: receiving Ethernet frames from a subscriber and removing preambles from the received Ethernet frames; producing and inserting GEM frame headers into the received Ethernet frames to build a GTC frame payload, wherein dynamic bandwidth report (DBR) information and an OMCI GEM frame are inserted based on upstream transmission band information; producing a GTC frame header using a preamble length corresponding to a data rate set according to a user's selection and attaching the produced header to the GTC frame payload to produce one upstream GTC frame; and scrambling the produced upstream GTC frame and transmitting or repeatedly transmitting the upstream GTC frame according to the set data rate.

In this case, a preamble of the upstream GTC frame may have a length of 128 bits when the set data rate is 2.488 Gbps and 64 bits when the data rate is 1.244 Gbps.

Also, the upstream GTC frame may be transmitted once when the data rate set according to a user's selection is 2.488 Gbps and twice repeatedly when the data rate is 1.244 Gbps.

Additional features of the invention will be set forth in the description which follows, and in part will be apparent from the description, or may be learned by practice of the invention.

Advantageous Effects

According to the present invention as described above, IPTV service with hundreds of channels can be downstream provided to subscribers through a 10-Gbps GPON ONT in a FTTH service network, and an upstream transmission band twice as high as in conventional EPON technology can be provided for a variety of services. Furthermore, adaptation to a GPON OLT for upstream 1.244 Gbps or a GPON OLT for 2.488 Gbps can be easily performed through a single GPON ONT without using an additional device according to a user's selection. Accordingly, the GPON ONT according to the present invention can provide both upstream data rates of 1.244 Gbps and 2.488 Gbps.

BRIEF DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

Figure 1:
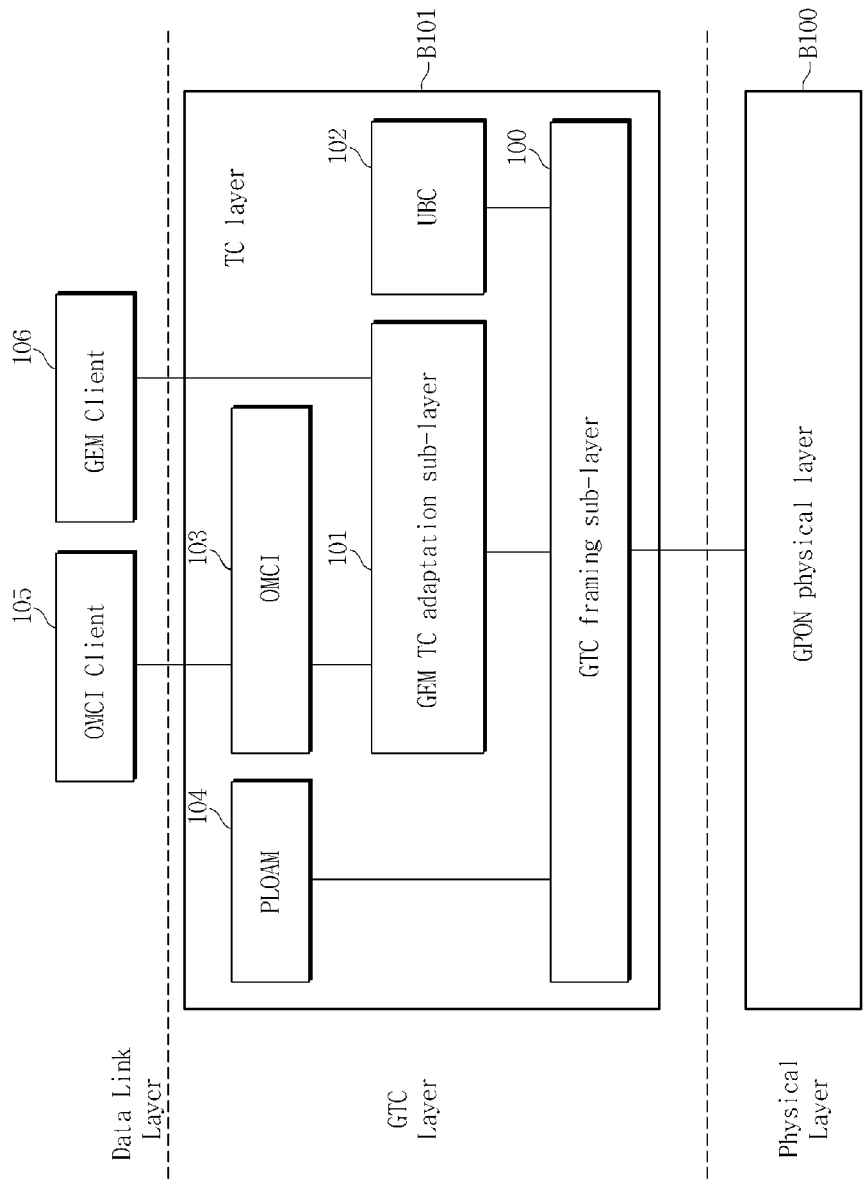
FIG. 1 illustrates a structure of an optical network terminal (ONT) in a gigabit passive optical network (GPON) according to a standard of the ITU-T G.984 group.
Figure 2:
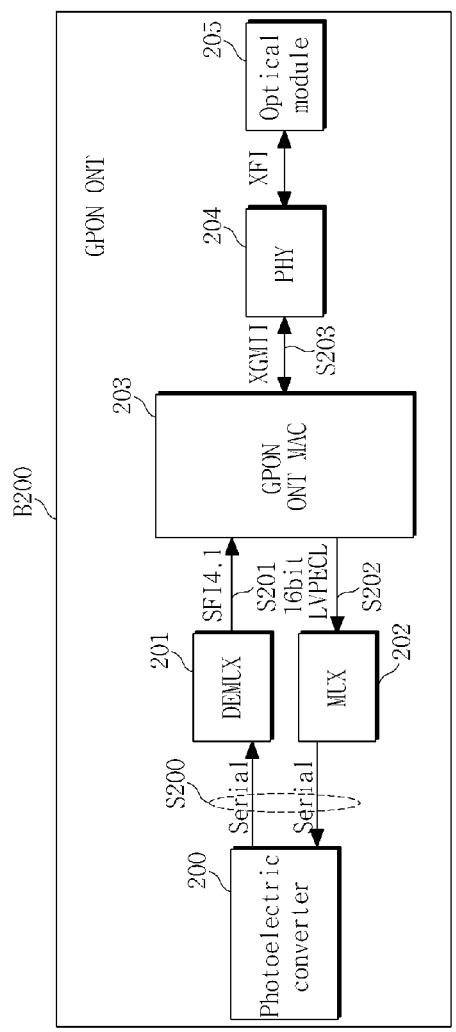
FIG. 2 is a block diagram illustrating a GPON ONT according to an exemplary embodiment of the present invention.

FIG. 2 is a block diagram illustrating an optical network terminal (ONT) in a gigabit passive optical network (GPON) according to an exemplary embodiment of the present invention.

Referring to FIG. 2, a photoelectric converter 200 that can be implemented by small form-factor pluggable physical medium dependent (SFP PMD) converts an optical signal into a serial electrical signal S200 or a serial electrical signal S200 into an optical signal, and controls to transmit output power of the optical signal only at an upstream transmission time.

Meanwhile, in an exemplary embodiment of the present invention, a demultiplexer (DEMUX) 201 for 10 Gbps, which is available from Vitesse, is used to support a downstream data rate of 10 Gbps. A multiplexer (MUX) 202 for 2.488 Gbps, which is available from Vitesse, is used to provide upstream data rates of 1.244 Gbps and 2.488 Gbps. According to the present invention, the ONT B200 provides an asymmetrical link data rate, resulting in a structure in which the MUX 202 and DEMUX 201 are unidirectional.

The 10-Gbps DEMUX 201 receives the serial electrical signal S200, extracts a clock, and converts the serial signal into a 16-bit parallel signal S201. The 2.488-Gbps MUX 202 converts a 16-bit parallel signal S202 into the serial signal S200 using the clock extracted by the 10-Gbps DEMUX 201. For reference, the 10-Gbps DEMUX 201 extracts 622.08 MHz and 155.52 MHz clocks from the 10-Gbps serial signal. The 622.08 MHz clock is used for a downstream GPON interface, and the 155.52 MHz clock is used for an upstream GPON interface.

A 10-Gbps GPON ONT MAC 203 performs a GPON protocol processing function, such as production and extraction of a GPON transmission convergence (GTC) frame, production and extraction of a GPON encapsulation method (GEM) frame, and transmission/reception of an Ethernet frame to/from a subscriber terminal, according to the G.984.3 standard. To implement the present invention, any one of at least 2.488 Gbps and 1.244 Gbps data rates is serviced for an upstream signal according to a user's selection. A configuration and operation for the data rate will be described in greater detail with reference to FIGS. 3 and 4.

A 10-Gbps PHY 204 connected to the subscriber terminal performs a physical coding sub-layer (PCS) function and physical medium attachment (PMA) function on Ethernet frames received from the GPON ONT MAC 203 via a 10-Gbps XGMII interface S203. That is, the 10-Gbps PHY 204 transfers the subscriber Ethernet frame extracted by the MAC 203 to a subscriber port.

An XFP optical module 205 converts a serial electrical signal output from the 10-Gbps PHY 204 into an optical signal or outputs an input optical signal as a serial electrical signal.

A structure of the GPON ONT MAC module indicated by B300 shown in FIG. 2 will now be described in greater detail with reference to FIG. 3.

Figure 3:
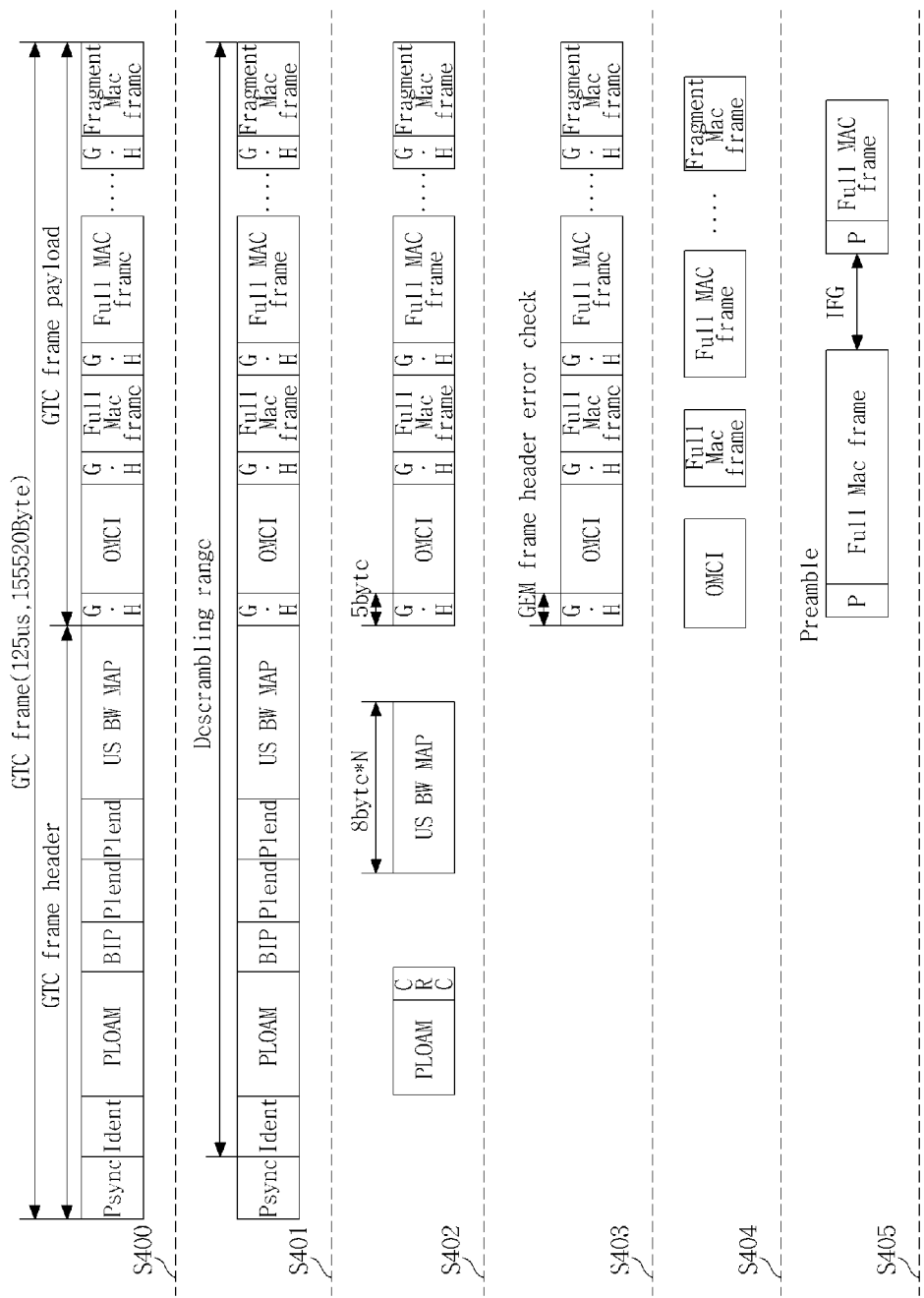
FIG. 3 illustrates a structure of a GPON ONT MAC module B300 of FIG. 2.

Referring to FIG. 3, the GPON ONT MAC module B300 includes an input signal parallelizer 300 and an output signal serializer 301, a GPON interface 302, a GTC frame processor 303, a GEM frame processor 304, a subscriber interface 305, a PLOAM transceiver 311, an ONT management control interface (OMCI) transceiver 312, and a CPU interface 313.

The GPON ONT MAC module B300 uses a 64-bit 155.52 MHz clock to support a downstream data rate of 10 Gbps, and a 16-bit 77.76 MHz clock to support an upstream data rate of 1.244 Gbps. The GPON ONT MAC module B300 uses a 16-bit 155.52 MHz clock to support an upstream data rate of 2.488 Gbps. One of the 77.76 MHz clock and the 155.52 MHz clock is selected for the upstream data rate by a user. A value of the upstream data rate set by the user may be externally delivered by entering the value into an internal register of the CPU interface 313.

The input signal parallelizer 300 parallelizes the 16-bit data received from the external 10-Gbps DEMUX 201 into 64-bit data. Also, the input signal parallelizer 300 divides an input frequency of 622.08 MHz by four into a clock frequency of 155.52 MHz.

The output signal serializer 301 operates in one of two modes according to the upstream data rates. In the case of the data rate of 1.244 Gbps, the output signal serializer 301 repeatedly transmits 16-bit data input according to the clock frequency of 77.76 MHz, twice for each bit, in order to adapt to the external 2.488 Gbps MUX 202. Accordingly, the output signal serializer 301 converts the 1.244 Gbps data into the 2.488 Gbps data and transmits the 2.488 Gbps data. A corresponding receiving side receiving the data only selects one of the two repeatedly transmitted data because it extracts data using the 77.76 MHz clock frequency. Meanwhile, in the case of the data rate of 2.488 Gbps, the output signal serializer 301 is directly adapted to the external 2.488 Gbps MUX 202 without doing a separate task. The receiving side can correctly extract the data because it uses the 155.52 MHz clock frequency. Thus, the upstream data rates of 1.244 Gbps and 2.488 Gbps are provided using the single GPON ONT MAC module B300.

The GPON interface 302 discovers a synchronization pattern of a GTC frame from downstream 64-bit data and produces a control signal for turning an optical signal on or off, which is required to transmit an upstream GTC frame. The GPON interface 302 performs a Hunt stage, a pre-synchronous stage, and a synchronous stage, in which the Hunt stage performs bit shift on the input 64-bit data to discover the synchronization pattern of the downstream GTC frame. After discovering the synchronization pattern, the Hunt stage then transmits aligned GTC frames to the GTC frame processor 303.

The GTC frame processor 303 for processing upstream and downstream GTC frames includes a GTC frame DEMUX 306, an upstream transmission band controller 307, and a GTC frame MUX 308. Accordingly, the GTC frame processor 303 demultiplexes a GTC frame, multiplexes the GTC frame, extracts an assigned upstream transmission time, and scrambles and descrambles the GTC frame.

That is, the GTC frame processor 303 descrambles the GTC frame input from the GPON interface 302, divides the GTC frame into a GTC frame header and a payload using the GTC frame DEMUX 306, extracts a PLOAM, and transmits the PLOAM to the PLOAM transceiver 311. The GTC frame DEMUX 306 extracts an upstream band assignment information field and transmits it to the upstream transmission band controller 307.

The upstream transmission band controller 307 controls a transmission time for the upstream GTC frame using the input upstream band assignment information. Meanwhile, the GTC frame MUX 308 adds a GTC frame header to a payload of the GTC frame input from the GEM frame processor 304 and transmits the GTC frame at the assigned transmission time. In this case, PLOAM data input from the PLOAM transceiver 311 is included in the GTC frame header. The GTC frame MUX 308 also adds a preamble having a different length depending on the upstream data rates. That is, the GTC frame MUX 308 adds a 64-bit preamble for the data rate of 1.244 Gbps and a 128-bit preamble for the data rate of 2.488 Gbps according to the G.984.3 standard.

The GEM frame processor 304 performs GEM header error check, GEM frame assembly, GEM header production, and GEM frame separation. A GEM frame DEMUX 309 checks if a 5-byte GEM frame header is erroneous, discards the GEM frame header, and extracts an Ethernet frame to be transmitted to the subscriber. The GEM frame processor 304 also assembles two divided GEM frames into one frame and transmits it. In this case, the Ethernet frames to be transmitted to the subscriber are identified using a GEM port identifier included in the GEM frame header. A GEM frame MUX 310 creates a GEM header and attaches it to an Ethernet frame input by the subscriber. The GEM frame MUX 310 transmits the GEM frame to the GTC frame MUX 308 during the upstream band determined by the upstream transmission band controller 307.

The OMCI transceiver 312 delivers an OMCI GEM frame which is received from the CPU interface 313 via the GEM frame MUX 310 and delivers an OMCI GEM frame extracted by the GEM frame DEMUX 309 to the CPU interface 313.

The subscriber interface 305 adds an Ethernet preamble to the Ethernet frame received from the GEM frame processor 304 and transmits the resultant Ethernet frame to the subscriber according to a 10-Gbps subscriber interface standard, and removes an Ethernet preamble from the Ethernet frame input by the subscriber and transmits the resultant Ethernet frame to the GEM frame processor 304. The subscriber interface 305 also performs a protocol conversion function of a RS layer according to the 10-Gbps Ethernet MAC standard.

Figure 4:
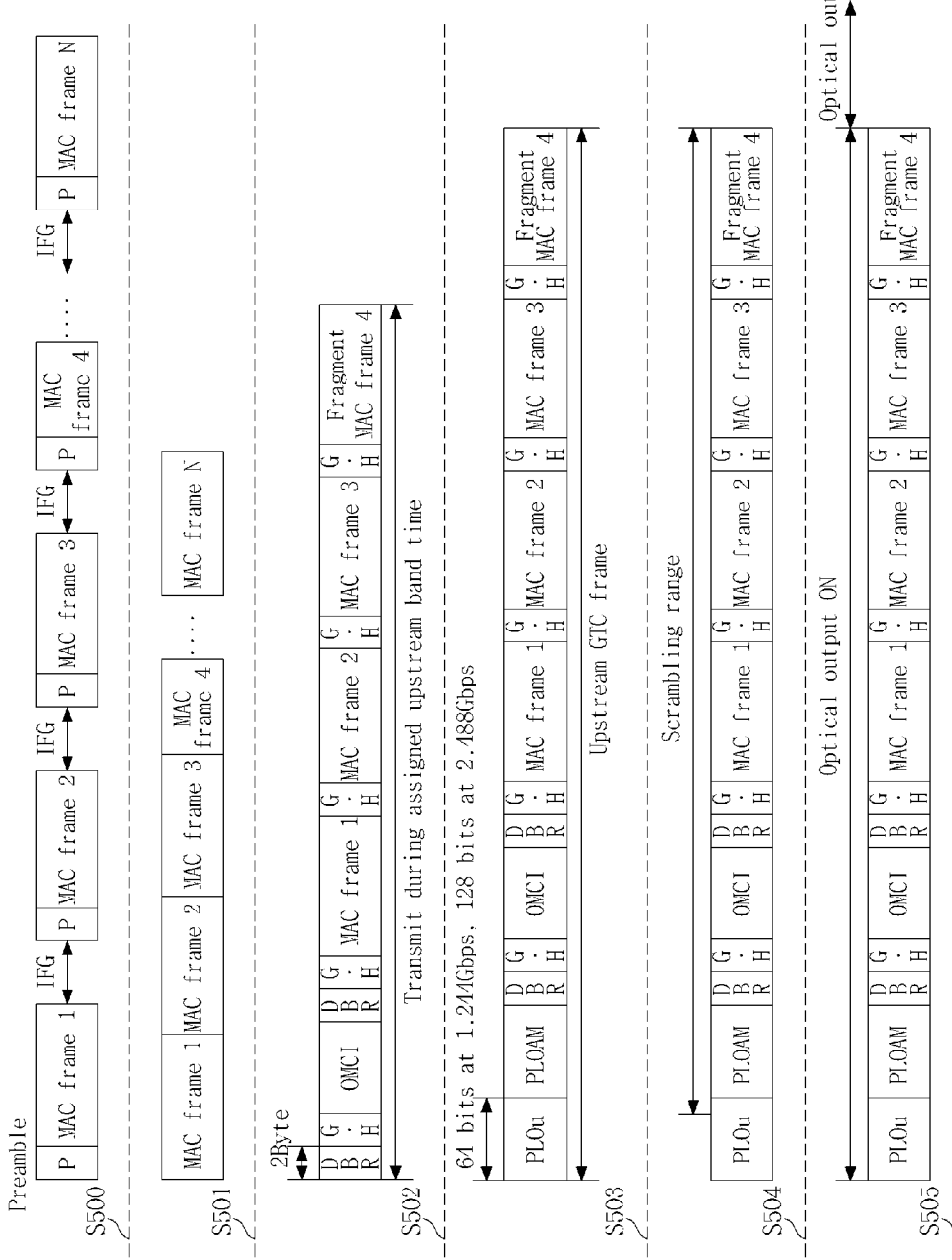
FIG. 4 illustrates a procedure of processing a downstream frame in a MAC B300 of an ONT according to an exemplary embodiment of the present invention.

FIG. 4 illustrates a procedure of processing a downstream frame in the MAC B300 of the ONT according to an exemplary embodiment of the present invention. A procedure of processing a GPON frame at a downstream data rate of 10 Gbps in the MAC B303 is performed in six steps.

In a first step, the GPON interface 302 discovers the synchronization pattern (Psync) of the downstream GTC frame. As shown in FIG. 4, the GTC frame consists of a GTC frame header and a GTC frame payload. Data to be transmitted to the subscribers is in the GTC frame payload (s400).

In a second step, the GTC frame processor 303 descrambles the GTC frame from the synchronization pattern (Psync) of the GTC frame to an end thereof (s401).

In a third step, the GTC frame DEMUX 306 extracts PLOAM data, upstream band assignment information (US BW MAP, upstream bandwidth MAP), and the GTC payload from the GTC frame header of the downstream GTC frame (s402).

In a fourth step, the GEM frame DEMUX 309 extracts the GEM frames while checking if the GEM header (GH) included in the GTC frame payload is erroneous. When the GEM frame header is erroneous, the GEM frame DEMUX 309 discards the GEM frame data (s403).

In a fifth step, the GEM frame DEMUX 309 extracts an OMCI frame and an Ethernet frame to be transmitted to the subscriber using the GEM frame identifier included in the GEM frame header and separates the GEM frame header (s404).

In a sixth step, the subscriber interface 305 attaches an 8-byte preamble to the Ethernet frame and transmits the resultant Ethernet frame to the subscriber based on an Inter Frame Gap (IFG) (s405).

Figure 5:
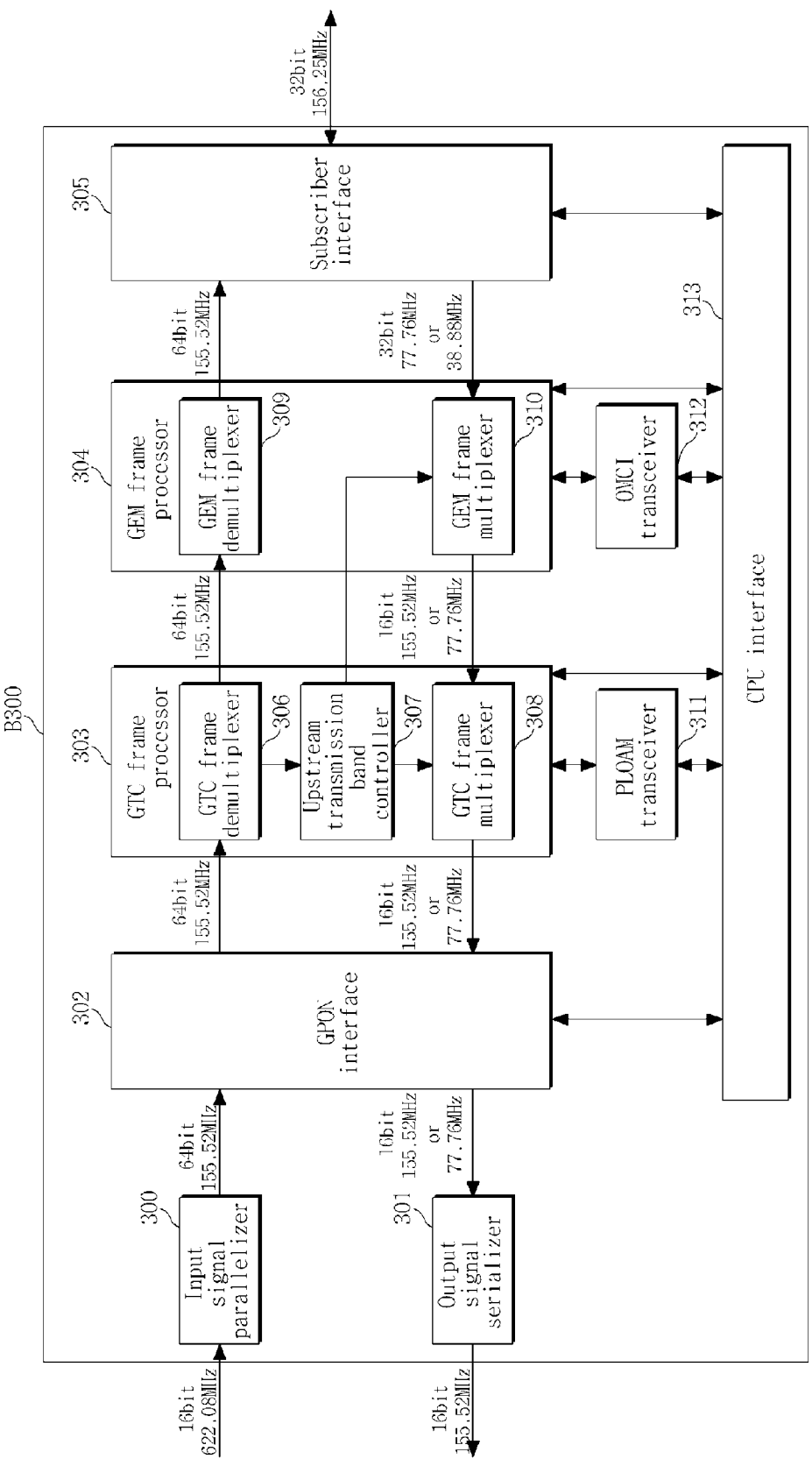
FIG. 5 illustrates a procedure of processing an upstream frame in a MAC B300 of an ONT according to an exemplary embodiment of the present invention.

FIG. 5 illustrates a procedure of processing an upstream frame in the MAC B300 of the ONT according to an exemplary embodiment of the present invention. A procedure of processing the GPON frame at the upstream data rate of 1.244 Gbps or 2.488 Gbps in the MAC B300 is performed in six steps, as well.

In a first step, the Ethernet frames are received from the subscriber via the subscriber interface 305 (s500).

In a second step, the subscriber interface 305 removes a preamble from the input Ethernet frame and transmits the resultant Ethernet frame to a service traffic container (T-CONT) according to a service type (s501).

In a third step, the GEM frame MUX 310 produces a GEM frame header for the Ethernet frames input by the subscriber interface 305 and attaches it to the Ethernet frames. The Ethernet frames are stored in a service T-CONT queue, and when an upstream transmission time extracted from the upstream band assignment information arrives, a GTC frame payload is transmitted. In this case, dynamic bandwidth report (DBR) information is included or not included based on the upstream transmission band information. When building the GTC frame payload, the GEM frame MUX 310 loads it in front of the OMCI GEM frame input from the OMCI transceiver 312, as shown in FIG. 5 (s502).

In a fourth step, the GTC frame MUX 308 produces the GTC frame header and attaches it to the GTC frame payload received from the GEM frame MUX 310 to build one upstream GTC frame. In this GTC frame header, the PLOAM input from the PLOAM transceiver 311 is included based on the upstream transmission band information. The GTC frame MUX 308 also uses a different preamble length of the GTC frame depending on the upstream data rate. That is, in the case of 1.244 Gbps, the GTC frame MUX 308 uses a 64-bit preamble, and in the case of 2.488 Gbps, the GTC frame MUX 308 uses a 128-bit preamble (s503).

In a fifth step, the GTC frame MUX 308 scrambles the produced GTC frame. Scrambling is performed following a delimiter (s504).

In a sixth step, the output signal serializer 301 just transmits the received upstream GTC frame or copies each bit twice and transmits the copy, according to the upstream data rate. That is, when the user selects a data rate of 1.244 Gbps, the output signal serializer 301 transmits each bit of the GTC frame twice repeatedly, and when the user selects 2.488 Gbps, the output signal serializer 301 just transmits each bit. For reference, the output of the optical module will be controlled only for the transmission time for the upstream GTC frame.

As described above, according to the present invention, provision of the downstream data rate of 10 Gbps and the upstream data rate of 1.244 Gbps or 2.488 Gbps allows for 20 Mbps, high definition IPTV service with a maximum of 500 channels. In addition, the adaptation to the GPON OLT for upstream 1.244 Gbps or the GPON OLT for 2.488 Gbps can be easily performed through a single GPON ONT without using an additional device according to a user's selection, such that the device of the prevent invention can be compatible with a correspondent system. Furthermore, commercially available burst mode (BM)-IC chips with upstream data rates of 1.244 Gbps and 2.488 Gbps can be used according to the GPON standard of the G.984 group.

While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An optical network terminal (ONT) in a gigabit passive optical network (GPON) comprising a photoelectric converter, the ONT comprising:

a demultiplexer (DEMUX) for extracting a clock from a downstream electrical signal output from the photoelectric converter and converting the electrical signal into a parallel signal;

a multiplexer (MUX) for converting an upstream parallel electrical signal into a serial electrical signal using the clock extracted by the DEMUX;

a medium access control (MAC) block having a protocol processing function of the GPON, wherein the MAC block services any one of at least two data rates for the upstream signal according to a user's selection, at least in part by repeatedly transmitting data destined for a receiver configured to use a first data rate of the at least two data rates;

a physical (PHY) layer for transmitting a subscriber Ethernet frame extracted by the MAC block to a subscriber port; and an optical module for converting the downstream electrical signal output from the PHY layer into an optical signal and outputting the optical signal, or converting an input optical signal into an electrical signal and outputting the electrical signal to the PHY layer.

2. The ONT of claim 1, wherein the MAC block services an upstream data rate of 2.488 Gbps or 1.244 Gbps and a downstream data rate of 10 Gbps according to a user's selection.

3. The ONT of claim 2, wherein the MAC block differently sets a preamble length of a GPON transmission convergence (GTC) frame depending on a set upstream data rate.

4. The ONT of claim 3, wherein the MAC block repeatedly transmits the GTC frame at the upstream data rate of 1.244 Gbps.

5. The ONT of claim 1, wherein the MAC block comprises:

an input signal parallelizer for parallezing data output from the DEMUX and dividing an input frequency;

an output signal serializer for repeatedly transmitting input data on a bit-by-bit basis or directly transmitting input data according to a clock frequency set to adapt to the MUX at the first data rate or a second data rate that can be set according to a user's selection;

a GPON interface for discovering a synchronization pattern of a GPON transmission convergence (GTC) frame from the downstream data to output aligned GTC frames and outputting an optical output control signal required for upstream GTC frame transmission;

a GTC frame processor for processing the upstream and downstream GTC frames, wherein the GTC frame processor adds a preamble having a different length to the upstream GTC frame according to at least a first or second data rate that can be set;

a GEM frame processor for processing upstream and downstream GPON encapsulation method (GEM) frames;

a CPU interface for receiving a set data rate selected by the user; and a subscriber interface for delivering the received Ethernet frame from the GEM frame processor to a subscriber.

6. The ONT of claim 5, wherein the input signal parallelizer parallelizes 16-bit data into 64-bit data and divides the input frequency into a clock frequency of 155.52 MHz, and the output signal serializer repeatedly or directly transmits input 16-bit data according to a clock frequency of 77.76 MHz or 155.52 MHz at an upstream data rate of 2.488 Gbps or 1.244 Gbps.

7. The ONT of claim 6, wherein the output signal serializer repeatedly transmits the GTC frame at an upstream data rate of 1.244 Gbps.

8. A method for processing an upstream frame in a GPON optical network terminal capable of providing service for a plurality of transmission bands for an upstream signal, the method comprising:

receiving Ethernet frames from a subscriber and removing preambles from the received Ethernet frames;

producing and inserting GEM frame headers into the received Ethernet frames to build a GTC frame payload, wherein dynamic bandwidth report (DBR) information and an OMCI GEM frame are inserted based on upstream transmission band information;

producing a GTC frame header using a preamble length corresponding to one of first and second data rates set according to a user's selection and attaching the produced header to the GTC frame payload to produce one upstream GTC frame; and scrambling the produced upstream GTC frame and transmitting the upstream GTC frame once when the data rate set according to a user's selection is the first data rate, and twice when the data rate set according to a user's selection is the second data rate.

9. The method of claim 8, wherein a preamble of the upstream GTC frame has a length of 128 bits when the set data rate is 2.488 Gbps and 64 bits when the data rate is 1.244 Gbps.

10. The method of claim 9, wherein the upstream GTC frame is transmitted once when the data rate set according to a user's selection is 2.488 Gbps and twice repeatedly when the data rate is 1.244 Gbps.

11. The method of claim 8, wherein the upstream GTC frame is transmitted once when the data rate set according to a user's selection is 2.488 Gbps and twice repeatedly when the data rate is 1.244 Gbps.

* * * * *